3,221,013
PROCESS FOR MERCAPTOETHYLATING
AMINES
Donald L. Fields and Delbert D. Reynolds, Rochester,
N.Y., assignors to Eastman Kodak Company, Rochester, N.Y., a corporation of New Jersey
No Drawing. Filed June 9, 1961, Ser. No. 115,932
4 Claims. (Cl. 260—247.1)

This invention concerns a process for reacting mercaptoethylating reagents with primary and secondary amines to introduce the mercaptoethyl radical into amines in order to prepare aminoethanethiols, and a process for preparing an advantageous intermediate for use in the reaction.

Mercaptans and their derivatives are useful in many applications, for example, in the rubber industry, as disclosed by H. R. Snyder et al., J. Amer. Chem. Soc., 69, 2672 (1947), in the pharmaceutical field as disclosed by R. O. Clinton et al., J. Amer. Chem. Soc., 70, 950 (1948), and in the photographic industry in photographic emulsions and the like.

Among the mercaptans one highly useful class is the mercaptoethyl derivatives, in particular the aminoethanethiols derived from primary and secondary amines, and having the general formula $RR'NCH_2CH_2SH$, where R and R' are hydrogen, alkyl, aryl or aralkyl. Three methods have customarily been used to synthesize these compounds. One involves the reaction of aminoethyl halides with hydrosulfides of the alkali metals. Another is based on the condensation of aminoethyl halides with thiourea followed by alkaline hydrolysis. A third and more preferred method is the mercaptoethylation of primary and secondary amines by reaction with ethylene sulfide. This last process leaves much to be desired because of the difficulties encountered in handling ethylene sulfide. Ethylene sulfide readily polymerizes and cannot be stored safely in large quantities. Hence this process is not suitable for mercaptoethylation on a large scale.

Aminoethanethiols are valuable compounds. They are useful as antiradiation drugs. This family of compounds had shown the capacity to protect animal tissues against radiation. This use of aminoethanethiols is described in Chem. and Eng. News, November 23, 1959, pp. 42–43. The aminoethanethiols of our invention may be used in photography for various purposes. As shown hereinafter they may be advantageously utilized as unique fixing agents to fix silver halide emulsion layers subsequent to development in order to stabilize the silver image.

One object of this invention is to obtain aminoethanethiols by the mercaptoethylation of primary or secondary amines. Another object is to provide a mercaptoethylation process which avoids the difficulties inherent in using ethylene sulfide due to its inclination to polymerize. An additional object is to obtain mercaptoethyl derivatives. A further object is to provide reactions employing 2-hydroxyethylthiolcarbonate esters and 2-mercaptoethylcarbonate esters for providing useful compounds. An additional object is to obtain useful compounds by reacting 2-hydroxyethylthiolcarbonate esters and 2-mercaptoethylcarbonate esters with primary and secondary amines. Another object of this invention is to provide a process for the preparation of 2-hydroxyethylthiolcarbonate esters.

In carrying out our invention to produce an aminoethanethiol, we treat a primary or secondary amine with a compound of the generic formula, $ROCOACH_2CH_2B$-(Q), in which A and B are dissimilar and may be selected from the class consisting of sulfur and oxygen. R may be alkyl (methyl through octyl), aryl (phenyl and phenyl substituted with methyl through butyl groups) or aralkyl. Q may be hydrogen, —COR, —$CO_2R$, —CONHR, or —$CONR_2$ where R is defined as above. This reaction can be called mercaptoethylation of an amine.

Any amine with a replaceable hydrogen atom attached to the amino nitrogen is operative in this process. Thus the reagent $ROCOACH_2CH_2B(Q)$ may be reacted with any primary or secondary amine which is aliphatic, aromatic, or cyclic. When the amine reactant is aromatic it is preferable to have present a catalytic amount of a base such as sodium methoxide. Diamines are operable as long as at least one of its amine functions has the above-mentioned labile hydrogen atom.

In general, any amino function in the presence of other non-participating functions, for example, polyamines, polymines, amino acids, polypeptides, proteins, amino sugars, deacetylated chitin, gelatin, and the like, can be mercaptoethylated with the mercaptoethylating agents of our invention.

In carrying out our invention, we prepare representative compounds which fit into the generic formula. The first compounds are as follows: 2-hydroxyethylthiolcarbonate esters. Referring to the above generic formula, A=sulfur; R=alkyl (methyl through octyl), aryl, or aralkyl; B=oxygen; Q=hydrogen, —COR, —$CO_2R$, —CONHR, or —$CONR_2$ (R is defined as above). The preferred members of this group of compounds are those wherein Q is hydrogen.

Alkyl, aralkyl or aryl 2-hydroxyethythiolcarbonates may be prepared by reacting alkyl, aralkyl or aryl chloroformate with 2-mercaptoethanols, such as 2-mercaptoethanol, 3-mercapto-1, 2-propanediol, 1-mercapto-2-propanol, 1-mercapto-2-butanol, 1-mercapto-2-hexanol, 1-mercapto-2-heptanol, 1-mercapto-2-decanol, and the like, in the presence of an inorganic basic material which converts the mercaptoethanol to a mercaptide of an alkali or alkaline earth metal. Suitable reagents are the alkali metal bases such as sodium hydroxide, potassium hydroxide, or lithium hydroxide. The reaction is preferably carried out at a pH of 6 to 8, but may be varied. A two-phase solvent system is used employing water and an immiscible inactive solvent, such as benzene, ethyl ether, petroleum ether, or the like.

In our preferred embodiment, the reaction to obtain ethyl 2-hydroxyethylthiolcarbonate may be run continuously by reacting an aqueous solution of sodium 2-hydroxyethylmercaptide with a benzene solution of ethyl chloroformate by introducing the reactants simultaneously through a series of mixing reactors followed by distillation of the final product. The following formula indicates the reaction:

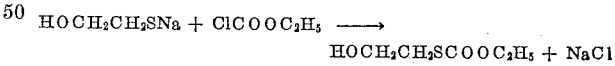

$HOCH_2CH_2SNa + ClCOOC_2H_5 \longrightarrow$ $HOCH_2CH_2SCOOC_2H_5 + NaCl$

Potassium hydroxide or lithium hydroxide may be substituted for sodium hydroxide in the reaction. Other chloroformates may be used such as aryl chloroformates, aralkyl or alkyl chloroformates employing alkyl groups of 1 to 8 carbon atoms. The alkyl chloroformates are preferred.

2-mercaptoethylcarbonate esters. Referring to the previously-mentioned generic formula: A=oxygen; R=alkyl (methyl through octyl), aryl, or aralkyl; B=sulfur; Q=hydrogen, —COR, —$CO_2R$, — CONHR, or —$CONR_2$ (R is defined as above). The preferred members of this group are those wherein Q is hydrogen.

Alkyl, aralkyl or aryl 2-mercaptoethylcarbonates may be prepared by reacting alkyl, aralkyl or aryl chloroformate with 2-mercaptoethanols, such as 2-mercaptoethanol, 3-mercapto-1,2-propanediol, 1-mercapto-2-propanol, 1-mercapto-2-butanol, 1-mercapto-2-hexanol, 1-mercapto-2-heptanol, 1-mercapto-2-decanol, and the like, in a nonbasic medium. The reaction is preferably carried out at a pH below 6, but may be varied. The product may be isolated by fractional distillation.

The yields of 2-mercaptoethylcarbonate ester obtained in the chloroformate-nonbasic medium reaction are low. Improved yields of the 2-mercaptoethylcarbonate esters are obtained by converting the 2-hydroxyethylthiolcarbonate esters by an isomerization process in the presence of certain catalysts. This process is described in detail in (Reynolds and Johnson copending application, Ser. No. 80,970, filed January 6, 1961, now abandoned).

In reactions known to those skilled in the art, the group of compounds defined as $ROCOACH_2CH_2BH$ may be converted to (1) $ROCOACH_2CH_2BCOR$, (2) $ROCOACH_2CH_2BCO_2R$ (3) $ROCOACH_2CH_2CONHR$ and (4) $ROCOACH_2CH_2CONR_2$ by treating said —BH compound with various reactants, respectively (1) acyl halides, (2) chloroformate esters (chlorocarbonates), (3) isocyanates, and (4) carbamoyl halides.

The following examples are intended to illustrate our invention and not to limit it in any way:

EXAMPLE 1.—PREPARATION OF ETHYL 2-HYDROXYETHYLTHIOLCARBONATE

A mixture of one liter of benzene, 542 g. (5 moles) of ethyl chloroformate and 200 ml. of water was stirred at 15° C. A solution consisting of 1.5 l. of water, 200 g. (5 moles) of sodium hydroxide and 390 g. (5 moles) of 2-mercaptoethanol was added over a period of one hour. During this time, the reaction temperature was maintained between 15° and 20° C. After stirring for an additional 15 minutes, the reaction mixture was acidified with hydrochloric acid. The benzene layer was separated, washed once with 500 ml. of cold water, separated and dried over anhydrous $MgSO_4$. Twenty-five grams of stearic acid was added and the benzene removed under vacuum. The ethyl 2-hydroxyethylthiolcarbonate was then distilled through an 18″ glass-helices-packed column equipped with a variable reflux ratio stillhead. B.P. 84° C./0.4 mm.; $n_D^{25}$ 1.4782; yield 653 g. (87 percent).

EXAMPLE 2

The following procedure is for a seven-hour run of a continuous reactor for the preparation of ethyl 2-hydroxyethylthiolcarbonate.

Three liters of ice and water were stirred while 800 g. (20 moles) of sodium hydroxide pellets were added in portions. To this cooled solution were added 1562 g. (20 moles) of 2-mercaptoethanol in portions. The resulting solution was diluted with water to a total of 5.7 liters. This solution was transferred to a reservoir. Two thousand one hundred and sixty g. (20 moles) of ethylchloroformate were diluted with stirring to 5.7 l. with benzene, then transferred to a second reservoir. The levels of the solutions in the two reservoirs were kept constant by adding additional quantities of the above solutions as required.

The reservoirs are connected to a reaction flask by pumps. The reaction flask is connected in series by Tygon tubing with three additional flasks, the flasks arranged in a cascade system with the first flask at the greatest height above the reservoirs.

With the pumps adjusted to deliver the reactants from each of the two reservoirs at the rate of 19 moles per hour and the reaction flasks equipped with stirrers and half-filled with water, the pumps were turned on. The two reservoir solutions were pumped into the highest flask where, under stirring, the two-phase reaction was commenced. As the first reaction flask filled to the level of the Tygon tubing, the partially completed reaction mixture overflowed (cascaded) to the next flask, and so on, until the completed reaction mixture collected in the final receiver.

Each three liters of benzene product solution from the final receiver was washed with 500 ml. water and 3 ml. concentrated hydrochloric acid. Stearic acid (20 g. per 3 l. of solution) was added to insure acid conditions during the subsequent distillation step. Benzene and residual water were removed azeotropically under reduced pressure. Product isolation was effected through a 14″ glass-helices-packed column.

Seven hours' operation of the reactor produced 18.25 kg. or 91.6 percent of ethyl 2-hydroxyethylthiolcarbonate, B.P. 110° C., $n_D^{25}$ 1.4782.

*Anal.*—Calcd. for $C_5H_{10}O_3S$: C, 40.0; H, 6.7; S, 21.3. Found: C, 40.3; H, 6.7; S, 21.1.

EXAMPLE 3.—n-HEXYL 2-HYDROXYETHYLTHIOLCARBONATE

To a vigorously stirred solution of 823 g. (5 moles) n-hexyl chloroformate in three liters of benzene, were added slowly with cooling a solution of 200 g. (5 moles) sodium hydroxide and 390 g. (5 moles) of 2-mercaptoethanol in three liters of water. The reaction mixture was stirred an additional hour, acidified with hydrochloric acid, and the organic layer distilled through a 14″ packed column. n-Hexyl 2-hydroxyethylthiolcarbonate (B.P. 109° C./0.05 mm., refractive index 1.4718) was obtained in 77.4 percent yield.

EXAMPLE 4.—PHENYL 2-HYDROXYETHYLTHIOLCARBONATE

In a manner described in Example 3 for the preparation of n-hexyl 2-hydroxyethylthiolcarbonate, phenyl 2-hydroxyethylthiolcarbonate was prepared. Phenyl chloroformate was dissolved in benzene and reacted with 2-mercaptoethanol.

EXAMPLE 5.—ISOBUTYL 2-HYDROXYETHYLTHIOLCARBONATE

Isobutyl 2-hydroxyethylthiolcarbonate was prepared by the procedure of Example 1 in 85 percent yield from isobutyl chloroformate and sodium 2-hydroxyethylmercaptide on a 3.7 mole basis. The reaction was considerably more sluggish than in the preparation of ethyl 2-hydroxyethylthiolcarbonate, necessitating a 4-hour mercaptide addition period at 40° C. The product had a B.P. of 81° C./0.1 mm., $n_D^{25}$ 1.4696 and gave a negative $I_2$-mercaptan test.

*Anal.*—Calcd. for $C_7H_{14}O_3S$: C, 47.2; H, 7.8; S, 18.0. Found: C, 47.0; H, 7.9; S, 17.8.

EXAMPLE 6.—PREPARATION OF ETHYL 2-MERCAPTOETHYLCARBONATE 2-mercaptoethanol (156 g., 2.0 moles) and ethyl chloroformate (434 g., 4.0 moles) were heated on a steam bath under a reflux condenser for seven hours. Crude ethyl 2-mercaptoethylcarbonate was collected by distillation, B.P. 74–80° C./7.0 mm., $n_D^{25}$ 1.4568. Yield, 105 g. (35 percent).

*Anal.*—Calcd. for $C_5H_{10}O_3S$: C, 40.0; H, 6.7; S, 21.3. Found: C, 40.2; H, 6.7; S, 21.3.

EXAMPLE 7.—n-HEXYL 2-MERCAPTOETHYLCARBONATE n-Hexyl 2-mercaptoethylcarbonate was prepared in a 200-ml. flask equipped with a 14″ packed column, and a variable-rate stillhead. In the flask was placed 103 g. (0.5 mole) of n-hexyl 2-hydroxyethylthiolcarbonate (Example 3) and 0.002 g. of uranyl acetate. The system was placed under vacuum and distilled, producing 85 g. or 82 percent yield of n-hexyl 2-mercaptoethylcarbonate (B.P. 75° C./0.2 mm., refractive index 1.4542, 99.5 percent pure by iodometric titration).

Similarly, aryl 2-mercaptoethylcarbonates may be obtained by isomerizing aryl 2-hydroxyethylthiolcarbonates.

EXAMPLE 8.—MERCAPTOETHYLATION WITH ALKYL 2-HYDROXYETHYLTHIOLCARBONATES

*General procedure.*—A mixture of 1.0 mole of ethyl 2-hydroxyethylthiolcarbonate, 3.0 mole of amine and 500 ml. of toluene was refluxed overnight under an efficient reflux condenser. Product isolation was effected by distillation under reduced pressure through a 14″ glass-helices-packed column. The results are tabulated in Table I.

Mercaptoethylation with isobutyl 2-hydroxyethylthiolcarbonate was effected in the same manner. The results are tabulated in Table II.

*Table I*

| Amine | Product | B. P. range, °C./m.m. | Percent yield of aminoethanethiol |
|---|---|---|---|
| Piperidine | 2-piperidino-ethanethiol. | 81–84/12 | 62 |
| 4-methylpiperidine | 2-(4-methylpiperidino)ethanethiol. | 101–104/12 | 59 |
| Morpholine | 2-morpholinoethanethiol. | 107–111/26 | 62 |
| Diethylamine | 2-diethylaminoethanethiol. | 73–74/34 | 61 |
| Di-n-butylamine | 2-di-n-butylaminoethanethiol. | 64/0.7 | 73 |
| n-Hexylamine | 2-n-hexylaminoethanethiol. | 114–130/15 | 46 |

*Table II*

| Amine | Product | B. P. range, °C./mm. | $n_D^{25}$ | Percent yield of aminoethanethiol |
|---|---|---|---|---|
| Piperidine | 2-piperidino-ethanethiol. | 88–91/15 | 1.4985 | 61 |
| Morpholine | 2-morpholino-ethanethiol. | 109–114/24 | 1.5014 | 57 |
| Di-n-butylamine | 2-di-n-butyl-aminoethanethiol. | 64/0.7 | 1.4619 | 69 |
| n-Hexylamine | 2-n-hexylamino-ethanethiol. | 63–65/0.7 | 1.4691 | 46 |

EXAMPLE 9.—MERCAPTOETHYLATION WITH ALKYL 2-MERCAPTOETHYLCARBONATES

*General procedure.*—A mixture of amine (3.0 moles) and anhydrous toluene (500 ml.) was brought to reflux under an efficient condenser topped by an acetone-Dry Ice trap. Ethyl 2-mercaptoethylcarbonate (150 g., 1.0 mole) was then added dropwise to the reaction mixture over a one-hour period. After refluxing overnight, the 2-aminoethanethiol was isolated by distillation through a 14″ glass-helices-packed column equipped with a variable take-off head.

*Table III*

$RNH_2 + EtOCO_2 CH_2CH_2SH \rightarrow RNHCH_2CH_2SH + CO_2 + EtOH$

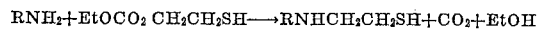

| No. | RNH— | Percent Yield | Percent Purity [a] | B.P., °C./mm. | $n_D^{25}$ | Calculated C | Calculated H | Calculated N | Found C | Found H | Found N |
|---|---|---|---|---|---|---|---|---|---|---|---|
| 1 | iso-$C_3H_7$NH— | 7 | 82.2 | 56/18 | | 50.4 | 10.9 | 11.8 | 51.0 | 10.8 | 11.2 |
| 2 | n-$C_4H_9$NH— | 32 | 98.2 | 76/13 | 1.4694 | | | | | | |
| 3 | iso-$C_4H_9$NH— | 37 | 94.2 | 79/23 | 1.4645 | 54.1 | 11.3 | 10.5 | 53.8 | 11.4 | 10.6 |
| 4 | sec-$C_4H_9$NH— | 42 | 95.8 | 74/21 | 1.4670 | 54.1 | 11.3 | 10.5 | 54.2 | 11.3 | 10.4 |
| 5 | tert-$C_4H_9$NH— | 15 | 92.4 | 70/29 | | 54.1 | 11.3 | 10.5 | 54.3 | 10.6 | 10.5 |
| 6 | $CH_2$=$CHCH_2$NH— | 44 | 94.9 | 70/16 | 1.4931 | 51.3 | 9.4 | 12.0 | 51.5 | 9.1 | 12.9 |
| 7 | n-$C_6H_{13}$NH— | 66 | 99.0 | 97/7 | 1.4680 | | | | | | |
| 8 | n-$C_8H_{17}$NH— | 64 | 98.5 | 83/0.3 | 1.4691 | 63.5 | 12.2 | 7.4 | 64.0 | 12.6 | 7.3 |
| 9 | n-$C_{10}H_{21}$HN— | 68 | 97.8 | 120/0.6 | 1.4674 | 66.4 | 12.4 | 6.5 | 66.0 | 12.2 | 6.6 |
| 10 | $C_6H_5CH_2$NH— | 72 | 100.0 | 84/0.1 | 1.5585 | | | | | | |
| 11 | $C_6H_{11}$NH— | 65 | 98.0 | 99/7 | 1.5040 | 60.4 | 10.7 | 8.8 | 60.3 | 10.7 | 8.6 |

[a] Purity determined by iodometric titration.

*Table IV*

$RNH_2 + EtOCO_2 CH_2CH_2SH \rightarrow R_2NCH_2CH_2SH + CO_2 + EtOH$

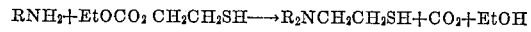

| No. | $R_2N$— | Percent Yield | Percent Purity [a] | B.P., °C./mm. | $n_D^{25}$ | Calculated C | Calculated H | Calculated N | Found C | Found H | Found N |
|---|---|---|---|---|---|---|---|---|---|---|---|
| 1 | $(C_2H_5)_2$N— | 73 | 100.0 | 85/56 | 1.4636 | | | | | | |
| 2 | $(C_3H_7)_2$N— | 88 | 98.8 | 77/10 | 1.4614 | 59.6 | 11.8 | 8.7 | 59.5 | 11.8 | 8.5 |
| 3 | (iso-$C_3H_7)_2$N— | 10 | 95.7 | 73/9 | 1.4670 | 59.6 | 11.8 | 8.7 | 59.3 | 11.8 | 8.7 |
| 4 | (n-$C_4H_9)_2$N— | 91 | 100.0 | 66/0.7 | 1.4620 | | | | | | |
| 5 | (iso-$C_4H_9)_2$N— | 89 | 100.0 | 91/10 | 1.4572 | 63.5 | 12.2 | 7.4 | 63.7 | 12.3 | 7.4 |
| 6 | (sec-$C_4H_9)_2$N— | 20 | 95.5 | 93/8 | 1.4715 | 63.5 | 12.2 | 7.4 | 63.2 | 12.0 | 7.4 |
| 7 | (n-$C_5H_{11})_2$N— | 90 | 100.0 | 91/0.8 | 1.4629 | | | | | | |
| 8 | (iso-$C_5H_{11})_2$N— | 92 | 99.6 | 85/1 | 1.4600 | | | | | | |
| 9 | ($CH_2$=$CHCH_2)_2$N— | 92 | | 90/17 | 1.4898 | 61.1 | 9.6 | 8.9 | 61.1 | 10.1 | 9.2 |
| 10 | ⬡N— | 96 | 99.2 | 79/10 | 1.4991 | | | | | | |
| 11 | O⬡N— | 92 | 98.9 | 92/10 | 1.5021 | | | | | | |
| 12 | $CH_3$N⬡N— | 94 | 100.0 | 95/10 | 1.5040 | | | | | | |
| 13 | —N⬡N— | 91 | 94.5 | 96/0.03 | | 46.6 | 8.8 | 13.6 | 46.4 | 8.9 | 13.6 |

[a] Determined by iodometric titration.

With diamines, for example piperazine, the mercaptoethylation is carried out in a similar manner. 2.2 moles of ethyl 2-mercaptoethylcarbonate and one mole of diamine (piperazine) were treated as above. In this case the product, N,N'piperazinebis-(ethanethiol) (Compound No. 13, Table IV) was isolated by distillation through an 8″ Vigreux column.

The results are tabulated in Tables III and IV.

EXAMPLE 10

Since many amines have low boiling points, very low reaction temperatures are obtained at normal pressure. With aromatic amines a basic catalyst, such as sodium methoxide, is used. By conducting the reaction in a rocking-type autoclave, employing a positive displacement pump to meter the 2-hydroxyethylthiolcarbonate ester or the 2-mercaptoethylcarbonate ester into the amine-solvent mixture, yields can be significantly improved because of the higher operating temperature.

*General mercaptoethylation procedure for amines of Table V.*—A charge consisting of amine (3.0 mole) and benzene (150 ml.) was loaded into a stainless steel autoclave. The autoclave was sealed, placed in a rocking heater stand and heated to 125–150° C. Agitation was started at this point and ethyl 2-mercaptoethylcarbonate (150 g., 1.0 mole) was metered into the autoclave by means of a "Lapp Pulsafeeder" metering pump. This addition required approximately 15 min., and was followed by 50 ml. of benzene. Agitation was continued for 5–10 min., at the operating temperature with the final pressure reaching 500–1500 p.s.i. depending on the vapor pressure of the amine used.

The autoclave was removed from the heater stand, cooled to room temperature, vented in a hood, and the product isolated by distillation through a 14″ glass-helices-packed column equipped with a variable take-off head. In some instances the mixture from the autoclave contained a considerable amount of solid carbamate salt

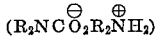

This material, however, was usually heat unstable and it decomposed into its components (amine and $CO_2$) before the distillation of the desired product commenced.

*General mercaptoethylation procedure for aromatic amines of Table VI.*—A mixture consisting of the aromatic amine (3.0 mole), ethyl 2-mercaptoethylcarbonate (150 g., 1.0 mole), benzene (150 ml.) and sodium methoxide (1.0 g.) was charged into a stainless steel autoclave. The autoclave was sealed and heated with agitation for one to three hours at 125–150°. After cooling, the mixture was removed from the autoclave and isolation of the product was effected by distillation through a 14″ Vigreux column equipped with variable take-off head.

Table V

$R_1R_2NH + C_2H_5OCO_2CH_2CH_2SH \longrightarrow$
$R_1R_2NCH_2CH_2SH + C_2H_5OH + CO_2$

| No. | $R_1R_2N-$ | Percent Yield | Percent Purity [c] | B.P., ° C./mm. | $n_D^{25}$ |
|---|---|---|---|---|---|
| 1 | $C_2H_5NH-$ | 69 | 99.2 | 75/63 | 1.4751 |
| 2 | $C_3H_7NH-$ | 75 | 95.1 | 82/46 | 1.4720 |
| 3 | $i-C_3H_7NH-$ | 77 | 96.9 | [d] 81/64 | -------- |
| 4 | $n-C_4H_9NH-$ | 66 | 97.2 | 81/18 | 1.4694 |
| 5 | $i-C_4H_9NH-$ | 72 | 97.2 | 76/23 | 1.4652 |
| 6 | $s-C_4H_9NH-$ | 68 | 95.3 | 83/33 | 1.4676 |
| 7 | $t-C_4H_9NH-$ | 64 | 99.2 | [e] 71/28 | -------- |
| 8 | $HOCH_2CH_2NH-$ [a] | 17 | 94.9 | [f] 74/0.02 | -------- |
| 9 | $(i-C_3H_7)_2N-$ | 28 | 99.0 | 73/13 | 1.4686 |
| 10 | $(s-C_4H_9)_2N-$ | 23 | 98.6 | 93/8 | 1.4723 |
| 11 | $HOCH_2CH_2NCH_3$ [b] | 63 | 96.3 | 78/0.9 | 1.4977 |

[a] Anal. Calcd. for $C_4H_{11}NOS$: C, 39.7; H, 9.1; N, 11.6. Found: C, 39.4; H, 8.6; N, 11.5.
[b] Anal. Calcd. for $C_5H_{13}NOS$: C, 44.4; H, 9.6; N, 10.4. Found: C, 44.7; H, 9.6; N, 10.2.
[c] Purity determined by iodometric titration.
[e] M.P., 34–35° C.
[f] M.P., 41–43° C.
[d] M.P., 61–63° C.

Table VI $RNH_2 + C_2H_5OCO_2CH_2CH_2SH \longrightarrow$
$RNHCH_2CH_2SH + C_2H_5OH + CO_2$

| No. | R | Yield | B.P., ° C./mm. | $n_D^{25}$ |
|---|---|---|---|---|
| 1 | $C_6H_5-$ | 81 | 100/0.5 | 1.6022 |
| 2 | $p-CH_3C_6H_4-$ | 86 | 91/0.02 | 1.5867 |
| 3 | $p-CH_3OC_6H_4-$ | 78 | 120/0.02 | 1.5914 |
| 4 | $p-ClC_6H_4-$ | 67 | 112/0.02 | 1.6127 |

EXAMPLE 11

$ROCOACH_2CH_2B(Q)$ is prepared as follows:

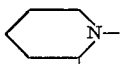

EXAMPLE 11—Continued

| | R | A | B | Q | |
|---|---|---|---|---|---|
| N | $CH_3CH_2-$ | S | O | H | Example 1 or 2. |
| O | $CH_3-$ | S | O | H | Replace ethyl chloroformate of Example 1 with methyl chloroformate. |
| P | $C_6H_5-$ | S | O | H | Example 4. |
| Q | $CH_3(CH_2)_2-$ | S | O | H | Replace ethyl chloroformate of Example 1 with propyl chloroformate. |
| R | $(CH_3)_2CH-$ | S | O | H | Replace ethyl chloroformate of Example 1 with isopropyl chloroformate. |
| S | $CH_3(CH_2)_3-$ | S | O | H | Replace ethyl chloroformate in Example 1 with butyl chloroformate. |
| T | $(CH_3)_2CHCH_2-$ | S | O | H | Example 5. |
| U | $CH_3(CH_2)_4-$ | S | O | H | Replace ethyl chloroformate of Example 1 with n-pentyl chloroformate. |
| V | $CH_3(CH_2)_5-$ | S | O | H | Example 3. |
| W | (N) through (V) | S | O | COR, R is alkyl or aryl | Compounds (N) through (V) reacted with any acyl chloride or acid anhydride. |
| X | (N) through (V) | S | O | $CO_2R$ | These compounds are identical to those of K. |
| Y | (N) through (V) | S | O | CONHR, R is alkyl or aryl | Compounds (N) through (V) reacted with alkyl or aryl isocyanate. |
| Z | (N) through (V) | S | O | $CONR_2$, $-NR_2$ is:  | Compounds (N) through (V) reacted with carbamoyl chloride ($R_2NCOCl$). The carbamoyl chloride is obtained from 1 mol phosgene reacted with 1 mol of the corresponding secondary amine ($R_2NH$). |

The amines which may be used in our invention are not limited to any particular number of carbon atoms providing they are primary or secondary amines. The amines which are operative include all types of primary and secondary amines including aliphatic, aromatic, and cyclic amines.

The reactants can be dissolved in suitable inert common solvents, such as toluene, dioxane, xylene, benzene, di-n-butyl ether, halo-genated hydrocarbons, and the like, and heated to the reflux temperature of the solvent used.

The aminoethanethiols of this invention may be used in photography for various purposes. For example, it is well known in photography to fix silver halide emulsion layers subsequent to development in order to stabilize the silver image. Instead of this procedure the aminoethanethiols may be applied to the developed print in vapor form, for example, from a boiling aqueous solution, with the result that a stable silver complex is formed. This procedure obviates the usual fixing and washing steps. However, the aminoethanethiols may be used in solutions for fixing prints in the usual manner, in which case they form soluble salts with the residual silver halide which can be readily washed out of the print. The solutions may further contain organic colloid hardening agents such as aluminum formoacetate, glutaraldehyde and potassium alum. The aminothiols will dissolve silver halide in acid solution whereas thiols lacking an amino substituent, such as mercaptoacetic acid, require alkaline conditions for fixing.

Our process of mercaptoethylating amines has many advantages over other systems of mercaptoethylating. We have already pointed out the advantage over the systems known in the prior art.

One of us has previously discovered an improved process of mercaptoethylating amines by reaction with a certain amount of ethylene monothiolcarbonate, Reynolds Ser. 721,678, filed March 17, 1958, now abandoned.

Our present invention discloses an even more advantageous over-all process for effecting the desired mercapto-ethylations. The 2-hydroxyethylthiolcarbonate esters of our present invention are the intermediate chemicals for preparing ethylene monothiolcarbonate, as disclosed in Fields and Johnson, Cer. No. 73,183, filed December 2, 1960, now patent No. 3,072,676, dated January 8, 1963. Hence, in economic terms, mercaptoethylating with 2-hydroxyethylthiolcarbonate esters is equivalent to effecting the over-all set of reactions in one less step.

The 2-mercaptoethyl carbonate esters are the preferred embodiment of our present invention. In the described process of mercaptoethylating amines, these agents are the preferred mercaptoethylating agents and effect the conversion of amines to aminoethanethiols with the highest yields. In the mercaptoethylation process the 2-mercaptoethylcarbonate esters may be considered the equivalent of the 2-hydroxyethylthiolcarbonate esters since, by the isomerization of Example 3 and more fully described in Ser. No. 80,970 (above), the 2-hydroxy-ethylthiolcarbonates can be converted to 2-mercapto-ethylcarbonate esters.

The invention has been described in detail with particular reference to preferred embodiments thereof, but it will be understood that variations and modifications can be effected within the spirit and scope of the invention described hereinabove and as defined in the appended claims.

We claim:

1. A process for mercaptoethylating amines which comprises heating an amine having at least one replaceable hydrogen atom with an alkyl 2-mercaptoethylcarbonate in which the alkyl moiety contains 1 through 8 carbon atoms.

2. A process for mercaptoethylating amines which comprises heating an amine having at least one replaceable hydrogen atom with ethyl 2-mercaptoethylcarbonate.

3. A process for mercaptoethylating amines which comprises heating an amine having at least one replaceable hydrogen atom with an alkyl 2-hydroxyethylthiolcarbonate in which the alkyl moiety contains 1 through 8 carbon atoms.

4. A process for mercaptoethylating amines which comprises heating an amine having at least one replaceable hydrogen atom with ethyl 2-hydroxyethylthiolcarbonate.

References Cited by the Examiner

UNITED STATES PATENTS

| | | | |
|---|---|---|---|
| 2,448,767 | 9/1948 | Carlson | 260—327 |
| 2,828,318 | 3/1958 | Reynolds | 260—327 |
| 2,875,228 | 2/1959 | Birum | 260—455 |
| 2,923,727 | 2/1960 | Neumoyer | 260—455 |
| 2,975,176 | 3/1961 | Bible | 260—247 |
| 2,983,726 | 5/1961 | Hendry | 260—247.1 |
| 3,072,676 | 1/1963 | Johnson et al. | 260—327 |

NICHOLAS S. RIZZO, *Primary Examiner.*

CHARLES B. PARKER, JOHN D. RANDOLPH, WALTER A. MODANCE, *Examiners.*